US007173819B2

(12) United States Patent
Wilcox

(10) Patent No.: US 7,173,819 B2
(45) Date of Patent: Feb. 6, 2007

(54) LAPTOP COMPUTER COOLING DEVICE

(76) Inventor: Abraham R. Wilcox, 4518 NW. 44th Pl., Gainesville, FL (US) 32606

( * ) Notice: Subject to any disclaimer, the term of this patent is extended or adjusted under 35 U.S.C. 154(b) by 243 days.

(21) Appl. No.: 10/992,241

(22) Filed: Nov. 18, 2004

(65) Prior Publication Data
US 2006/0104022 A1 May 18, 2006

(51) Int. Cl.
*G06F 1/20* (2006.01)
(52) U.S. Cl. .................. 361/687; 361/683; 165/80.1
(58) Field of Classification Search ........ 361/687–695; 165/80.1–80.3
See application file for complete search history.

(56) References Cited

U.S. PATENT DOCUMENTS 5,704,212 A * 1/1998 Erler et al. ................ 62/3.2

6,414,842 B1 * 7/2002 Cipolla et al. .............. 361/687

* cited by examiner

*Primary Examiner*—Yean-Hsi Chang
(74) *Attorney, Agent, or Firm*—Terry M. Sanks, Esquire; Beusse Wolter Sanks Mora & Maire, P.A.

(57) ABSTRACT

A device for cooling a computer, the device including a housing with a sidewall and a bottom forming an inner cavity, a horizontal board having a first end and a second end disclosed within the inner cavity, a motor connected to the horizontal board to rotate the horizontal board, a track disposed within the inner cavity with segments of the track at a higher elevation than other segments of the track, a first fan connected to a first end of the horizontal board displacing air vertically and nearly vertically connected to an end of the horizontal board and riding upon the track, a second fan fixed therethrough the sidewall to move air from outside of the housing to within the inner cavity, a third fan fixed therethrough the sidewall to move air from within the inner cavity to outside the housing; and a connection point to secure the computer to the device.

20 Claims, 5 Drawing Sheets

LAPTOP COMPUTER COOLING DEVICE

This application claims priority of Provisional Patent Application Ser. No. 60/520,348, filed on Nov. 17, 2003.

BACKGROUND OF THE INVENTION

This invention relates to laptop computers, and more specifically to a device and method to cool the electronic components of a laptop computer.

Laptop computers are extremely popular for users who travel a lot or who need to take their computer to a remote work site. To enhance their portability, these computers are designed to be as lightweight as possible and to pack a large number of electronic devices into a relative small package.

Because of the density of electronics inside the laptop, a number of strategies have been used to provide adequate cooling to the components inside the computer, using heat pipes, radiator fins, and fans. However, for at least some models of laptop computers, the lower surface of the computer becomes quite hot during operation. If adequate ventilation to this surface is not provided, overheating of the internal components may result along with possible malfunction. Additionally, if the user is using the laptop on their lap, it may become uncomfortable to continue working the computer while on the user's lap.

The creation of high temperatures inside a computer results from the central processing unit (CPU), memory modules, hard drive, and the video card. Generally, the CPU, in a desktop PC, leads to a heat dissipation of 50–80 watts, by itself. Modern-day laptop computers operate at a similar processing speed as a desktop PC. A desktop, however, is larger than a laptop computer, allowing more air to circulate when compared to the smaller casing of a laptop. At the same time, the smaller structured laptop computer generates approximately the same amount of heat as the larger desktop computer. In addition, the laptop computer's internal components are closer in proximity causing heat to be more easily conducted at greater transfer rates. These factors all pose significant damage potential to the computers hardware.

Though prior art exists that attempts to provide cooling for laptop computers, it would be advantageous to have a more effective device for cooling the internal components of a laptop while also providing added comfort to the user of the laptop.

SUMMARY OF THE INVENTION

This invention provides a method and device for cooling a laptop, while at the same time protecting a laptop user from excessive heat from the laptop. In one embodiment a device for cooling a computer is provided. The device includes a housing with a sidewall and a bottom forming an inner cavity. A horizontal board, or wing, having a first end and a second end is disclosed within the inner cavity. A motor is connected to the horizontal board to rotate the horizontal board. A track is disposed within the inner cavity with segments of the track at a higher elevation than other segments of the track. A first fan is connected to a first end of the horizontal board displacing air vertically and nearly vertically connected to an end of the horizontal board and riding upon the track. A second fan is fixed therethrough the sidewall to move air from outside of the housing to within the inner cavity. A third fan is fixed therethrough the sidewall to move air from within the inner cavity to outside the housing. A connection point to is provided to secure the computer to the device.

In another preferred embodiment, a method for cooling internal components of a portable computer is disclosed. The method comprises placing a track within an a cavity formed within a circular housing assembly having a high elevation and a low elevation. A motor is provided to rotate a wing positioned within the cavity wherein the wing has a fan attached at a first end. The first fan is rotated along the track. Air is blown into the cavity with a second fan formed therethrough the circular housing assembly. Air is exhausted from the cavity with a third fan formed therethrough the circular housing assembly. The computer is secured to sit above the housing assembly whereby an air cushion is formed between the housing assembly and the computer.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION

With reference to the figures, exemplary embodiments of the invention will now be described. The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Meaning, the scope of the invention disclosed is applicable to a plurality of devices for cooling devices, such as electronic devices that produce a high amount of heat. Thus, even though embodiments are described specific to laptop computers, the present invention is applicable for other devices that would benefit from cooling as well. The present invention has been described in terms of a separate device, but in an alternate embodiment the device could be designed for permanent attachment to a laptop computer, or the features could be incorporated in to the design of a portable case.

Figure 1:
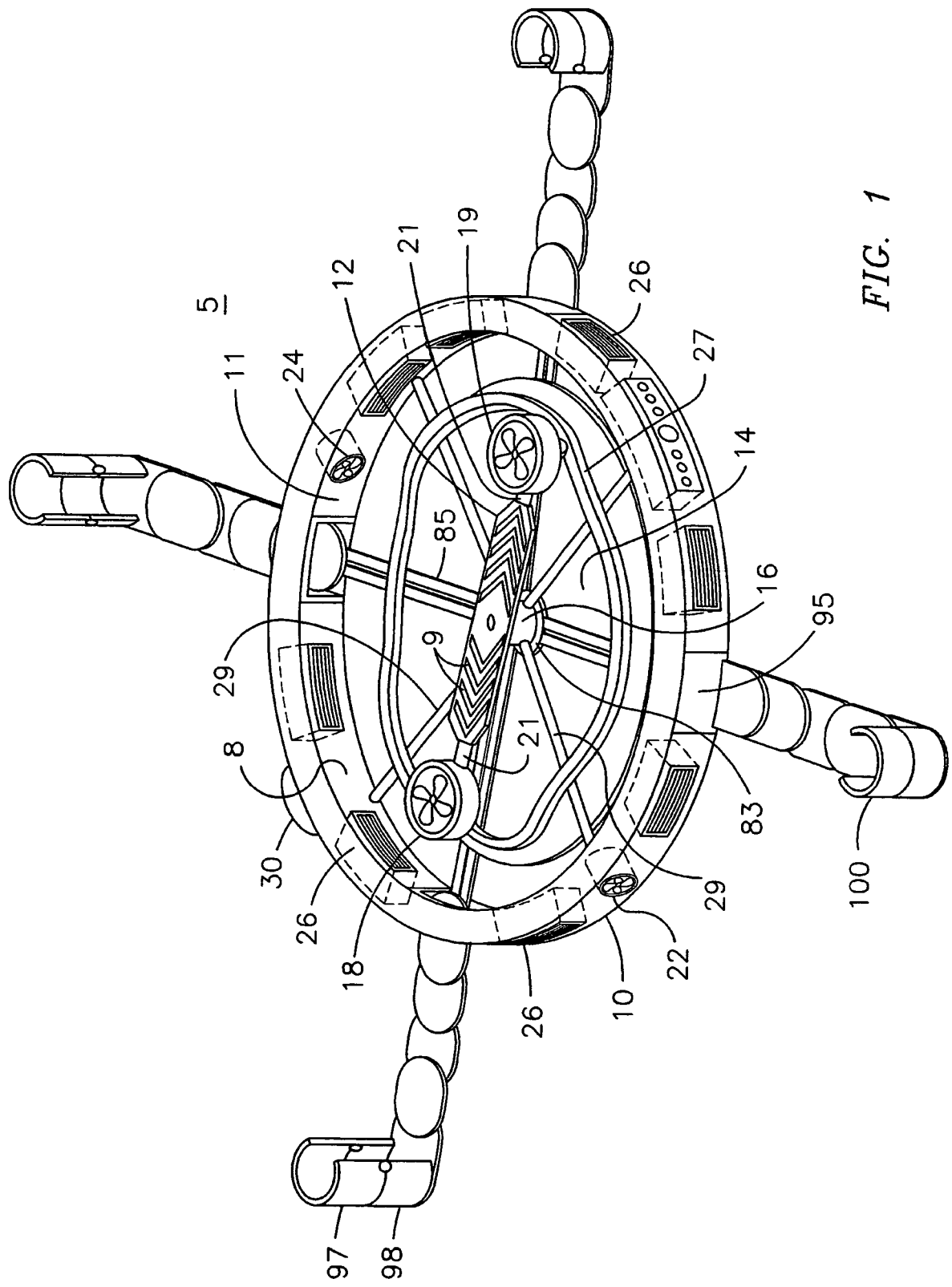
FIG. 1 illustrates an elevation view of an exemplary embodiment of several components of a preferred embodiment of the present invention.
Figure 3:
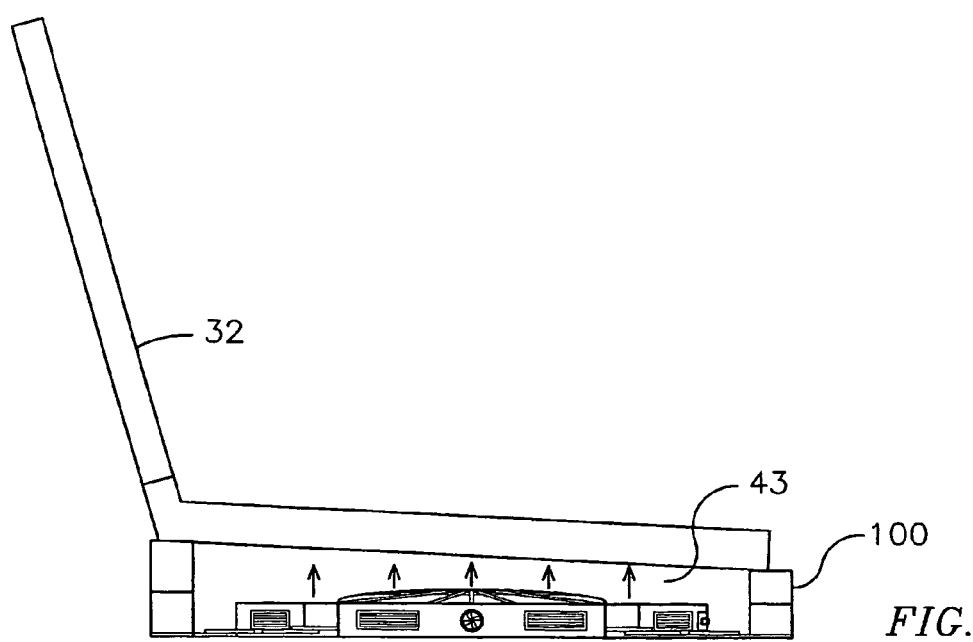
FIG. 3 illustrates side view of a computer connected to the present invention.

With reference now to the figures and in particular with reference to FIG. 1, an exemplary embodiment of a cooling device in accordance with an embodiment of the present invention is shown. As shown, the present invention has a housing 10 which has a vertical sidewall 11, a bottom surface 14, and an optional top surface 15 (not illustrated in FIG. 1). In a preferred embodiment, the housing 10 is circular or cylindrical in nature. However, other shapes, such as but not limited to rectangular and/or square are also possible. An arm, horizontal board, or wing 12 is located within the housing 10 and is connected to a bottom surface 14 of the housing 10. The wing 12 is connected to the bottom surface 14 by a central motor 16 that is operable to rotate the wing 12. In an exemplary embodiment, segments 9 from the wing 12 are removed and then possibly contoured like a fan blade to allow the wing 12 to pull air towards a top area where a device 32 would rest upon stands provided on the present invention 5, as illustrated in FIG. 3.

A first fan 18 and a second fan 19 are connected to opposite ends of the wing 12. In a preferred embodiment, the fans 18, 19 are connected by a movable connector, such as a socket connection joint 21, so that the fans 18, 19 are oriented to blow vertically upwards, and at varying acute angles as well as discussed below. In a preferred embodiment, an alternate angle track 27 is located within the housing 10 near or as part of the inside sidewall or the bottom surface 14. In another preferred embodiment, the alternate angle track 27 is located at a distance away from the inner sidewall within the housing. Poles 29 extend from the inner wall 8 of the housing 10 to which the track 27 is connected, at a higher elevation to create changes in elevation. The alternate angle track 27 alters the angular reach of the fans 18, 19 allowing the fans 18, 19 to provide air to a wider area of the laptop computer's 32 base. In an exemplary embodiment, an outer track, or rail, is provided that is connected to an inner surface of the sidewall 11. Though any numbers of elevation changes are possible, in a preferred embodiment, the rail 27 rises and lowers four times, equal distances apart from an adjacent raised elevation. To assist the fans 18, 19 with moving freely along the track 27, wheels 31, 33 are provided on an outer casing 34 of the fans 18, 19 which are positioned to ride upon the track 27.

Figure 2:
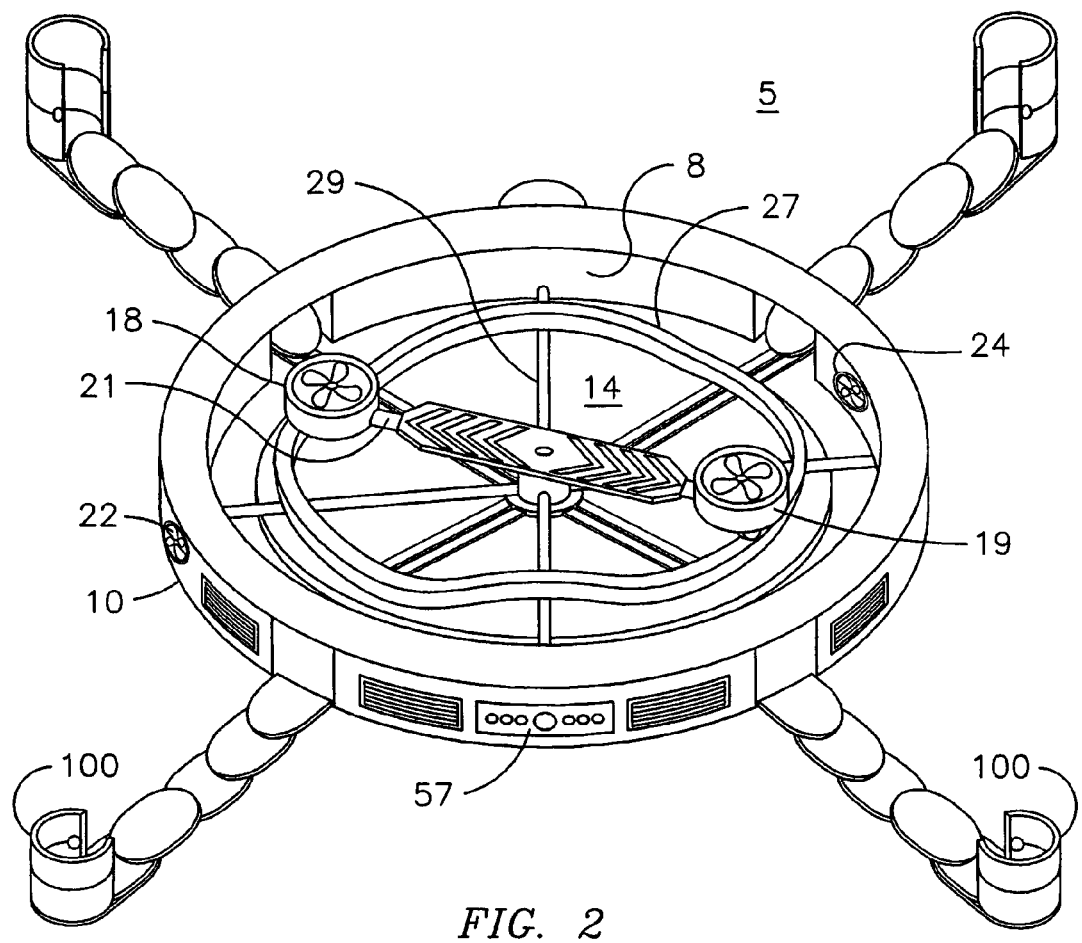
FIG. 2 illustrates an elevational view of an exemplary embodiment of several other components of the present invention in accordance with a preferred embodiment of the present invention.

As illustrated in FIG. 1, the sidewall 11 of the housing 10 has a plurality of vents 26 provided therethrough the sidewall 11. The vents 26 are located both above and below the wing 12. As further illustrated in FIG. 2, air injecting fans 22 and air removing fans 24 are also provided through the sidewall 11. Though a plurality of injecting fans 22 and removing fans 24 are disclosed, in a preferred embodiment, only one of each fan may be provided. An air injecting fan 22 is located on one side of the sidewall 11, preferably parallel to and/or below the wing 12 and is orientated to pull fresh air from outside of the housing 10 into present invention 5. In a preferred embodiment, the air injecting fan 22 is not positioned vertically, but instead is positioned at an angled to pull air upwardly into the housing 10. The air removing fan 24 is located on one side of the sidewall 11, such as opposite the air injecting fan, above the wing 12 and is orientated to pull air that gradually increases in temperature throughout the cooling process from the invention 5. In another preferred embodiment, the air removing fan 24 is angled downward to withdraw heated air downward and away from the laptop 32. In a preferred embodiment, all fans 18, 19, 22, 24 are standard computer fans, such as but not limited to ball-bearing fans and/or magnetic fans. These types of fans are used to promote a continuous thrust of cool air within the housing region.

Figure 4:
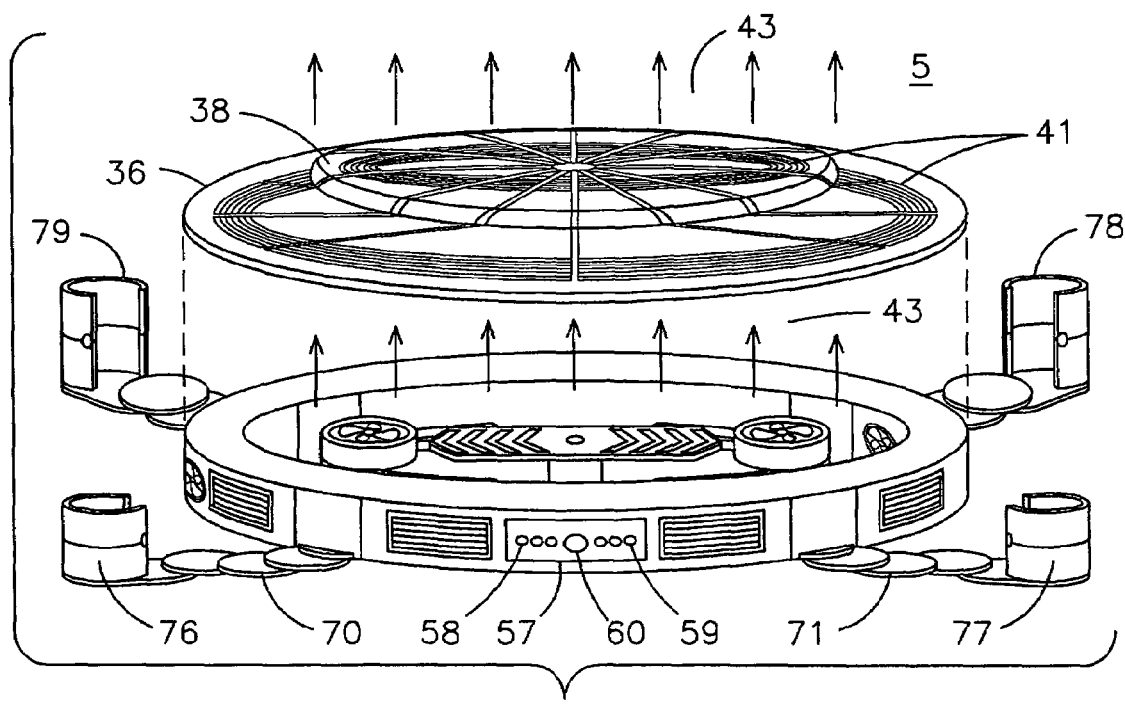
FIG. 4 illustrates an elevational view of an exemplary embodiment of several other components of the present invention including a ventilated top cover.
Figure 5:
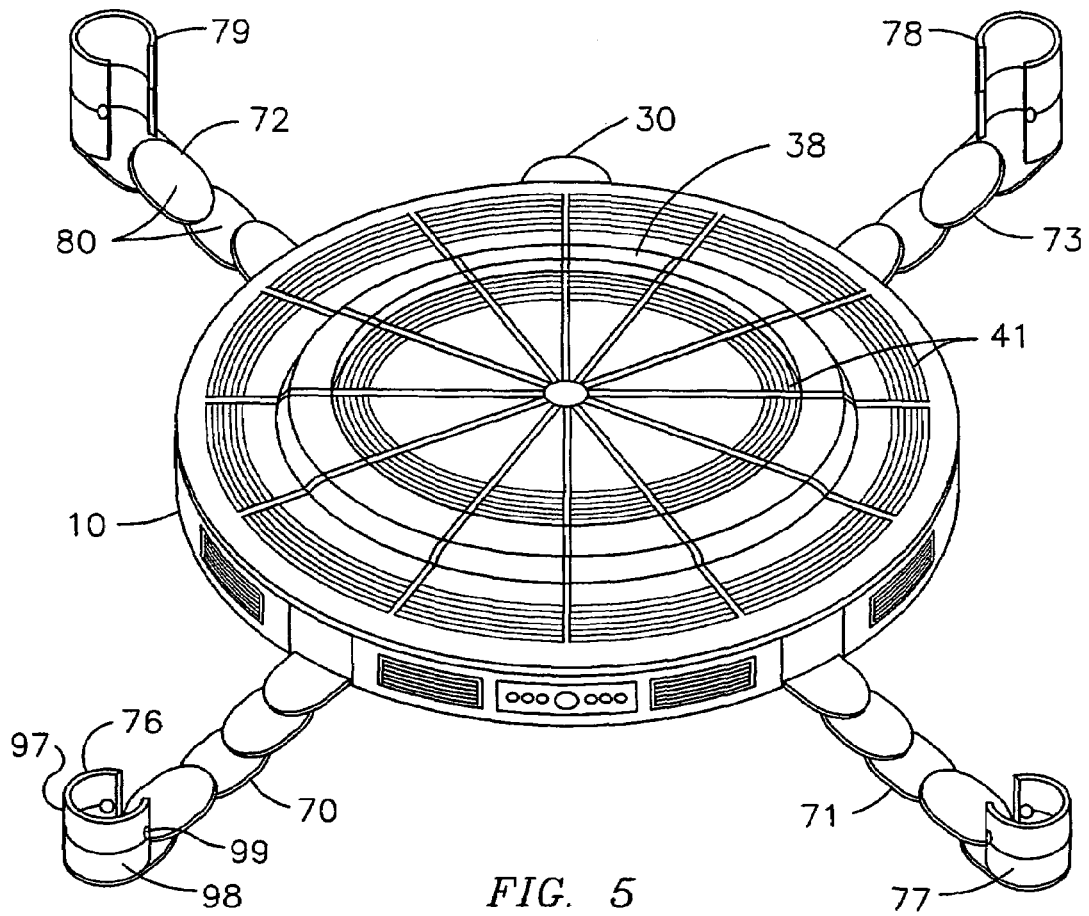
FIG. 5 illustrates an elevational view of an exemplary embodiment of the present invention with the ventilated top cover in place.

In a preferred embodiment, illustrated in FIGS. 4 and 5, the present invention 5 has a flat ventilated top 41, or cover 36. If the housing 10 is cylindrical in nature, the top 36 is also circular. The ventilated top 41 are provided to allow air flow from the internal components of the present invention 5 to the bottom of the laptop computer 32. In a preferred embodiment, an upward ridge 38 is displaced around the diameter of the top 5. The ridge 38 rises high enough and is wide enough to allow the fans 18, 19 to rotate freely about the ball joint without making contact to the top 36. The ventilated top 41 allow for cool air to flow from inside the housing 10 upwards into air space 43, such that a cool flow of air is realized throughout air space 43.

In a preferred embodiment, the motor and fans 18, 19, 23, 24 are powered by a battery source 30. In a preferred embodiment the battery source 30 is located on an outside surface of the sidewall 11, as illustrated in FIGS. 1 and 5. A transfer of electric power between the device connected to the present invention 5, such as a laptop computer 32, and the battery source 30 located on present invention 5 powers and recharges the battery. In operation when the user is mobile, the present invention 5 utilizes the battery source 30 to run the present invention. When the user is stationary and next to an electrical outlet, the present invention 5 can utilize the electrical outlet to run the present invention. In another preferred embodiment, power required to operate the motors and fans is supplied directly from the power source of the laptop computer 32.

Figure 6:
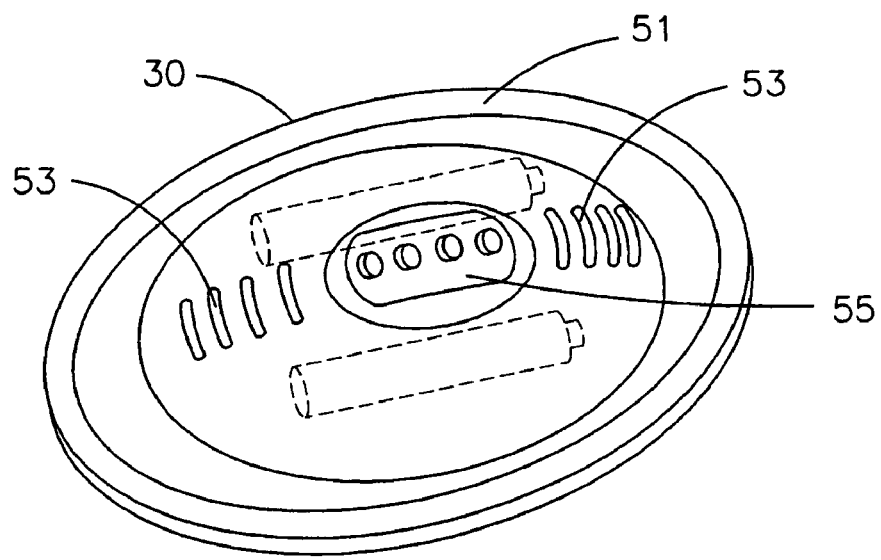
FIG. 6 illustrates a battery and its cover.

In a preferred embodiment, further illustrated in FIG. 6, the body of the battery is shaped in an ovular mold. A battery holder 51 is designed in a larger, than the battery 30 ovular fashion to encompass the battery source 30. Rubber griping grooves 53 are provided to allow a user ease in removing the battery source 30. A battery charge indicator 55 is also provided on the present invention 5 so that the user can determine a status of the power source 30.

On one side of the sidewall 11, a user control panel 57 is provided. In a preferred embodiment the control panel 57 has two illuminating LED fixtures 58, 59 and a fan speed dial 60. Each respective illuminating LED fixtures 58, 59 illustrate a revolving blade speed for an individual fan 18, 19. Thus, the user can visually determine whether both fans 18, 19 are operating at equal, or near equal proficiency. The fan speed setting dial 60 allows the user to control the RPM of all fans 18, 19, 22, 24 shown. In another preferred embodiment, the fan speed setting dial 60 also controls the speed of the wing 12, and in another preferred embodiment, a plurality of dials (not illustrated) is provided to control any number of fans/wing configurations.

The present invention has four extendable arms 70, 71, 72, 73 extending from inside the housing 10 to outside the housing 10. Each arm 70, 71, 72,73 is located at a point along the housing 10 so as to effectively create an extendable quadrilateral. This quadrilateral is optionally extendable and retractable so the length and width of the laptop computer 32 can fit snugly onto and into the present invention 5. Extending from the ends of each arm is a stand 76, 77, 78, 79. The stands 76, 77, 78, 79 elevate the laptop 32, once positioned upon the stands, above the present invention 5 which in turn creates a cushion of air 43 between the bottom of the laptop 32 and the top 36 of the present invention 5.

The arms 70, 71, 72, 73 form an "X" configuration and extend outward from a center 90 of the housing 10. The center 90 where the arms 70, 71, 72, 73 meet is a single wheel 83 that allows for the arms to swivel. Within the housing 10, in a preferred embodiment, the arms 70, 71, 72, 73 fit within a groove or track 85 within the bottom 14 of the housing 10. The arms 70, 71, 72, 73 extend out through respective doors 95 disposed therethrough the sidewall 11, as illustrated in FIG. 4. Once extended the doors 95 close to allow air to be directed towards the laptop computer 32 instead of out the doors. In a preferred embodiment, the arms 70, 71, 72, 73 are located within the housing 10 beneath where the alternate angle track 27 is at the elevated height, thus providing room for the arms 70, 71, 72, 73 and stands 76, 77, 78, 79.

In a preferred embodiment, the two front stands 76, 77 differ from the two rear stands 78, 79 in two general aspects. The first differentiation is an increased height is provided for the two front stands creating an acceptable ergonomic positioning for the user's wrists and posture. The front stands also have locking apparatus used to secure the laptop 32 to the present invention 5. Though locking apparatus 100 could be included in the back stands, the preference is to leave the back of the laptop open so that the laptop ports and/or cords are not interfered with when either locking or unlocking the laptop from the present invention. In another preferred embodiment, the arms 70, 71, 72, 73 have a swivel capability in a 360° rotation, allowing the laptop computer to easily rotate while being used. In another preferred embodiment, the heights for all stands 76, 77, 78, 79 are adjustable, thus resulting in less space being taken up by the arms and stands when retracted into the housing 10. In another preferred embodiment, the stands bend over to fit within the housing 10. In this embodiment, the stands 76, 77, 78, 79 have an upper and lower segment 97, 98 connected by a joint, such as two wheel attachments 99 that allow the upper body 97 to be bent over, thus reducing the height of the stands 76, 77, 78, 79. Those skilled in the art will readily recognize other ways to minimize and/or assist in securing the stands against and/or within the housing.

Figure 7:
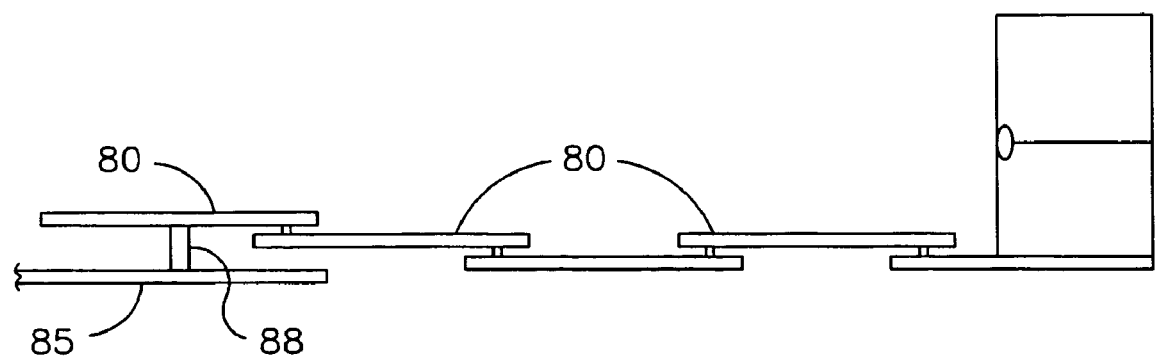
FIG. 7 illustrates a side view of an arm with discs and a stand.
Figure 8:
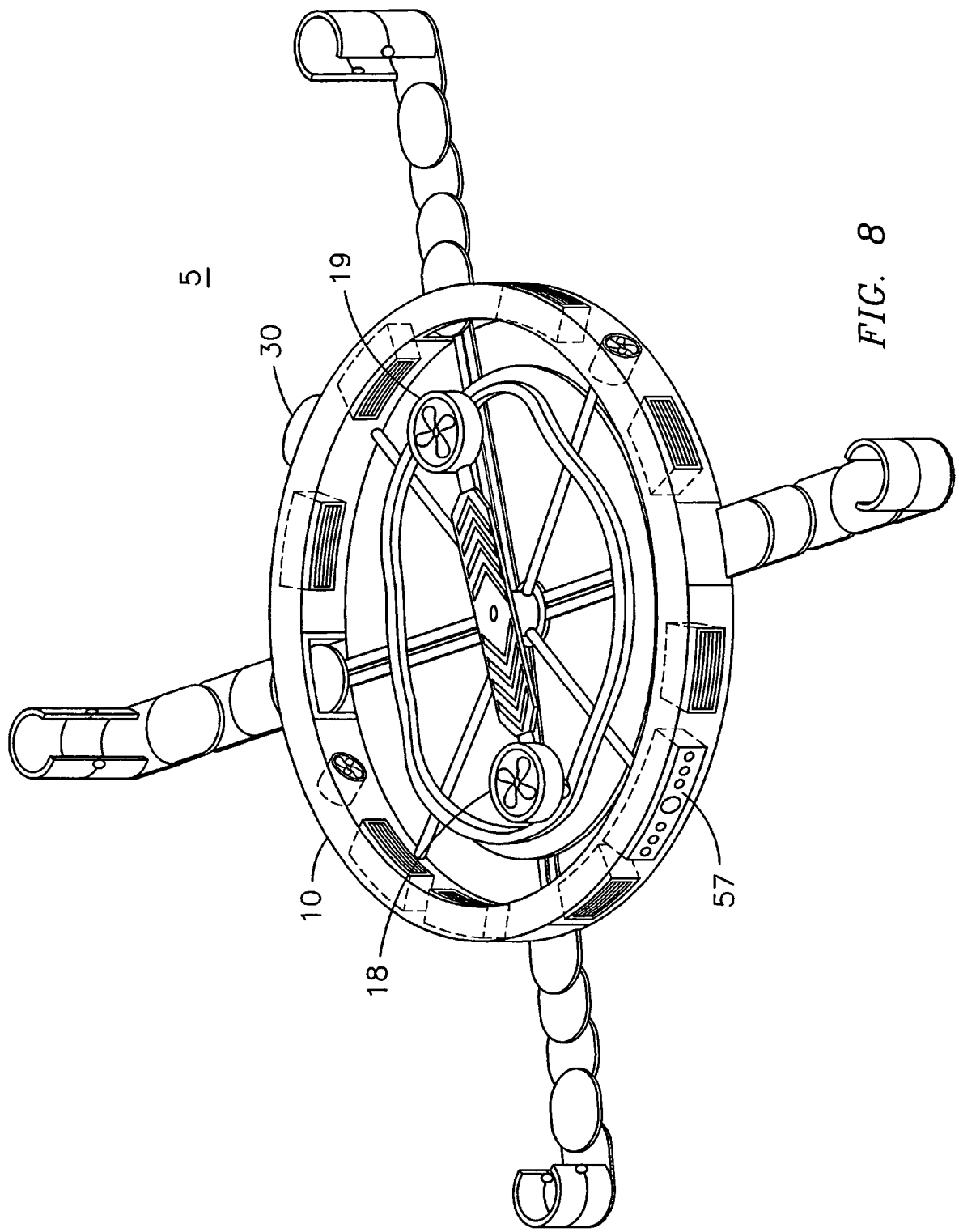
FIG. 8 illustrates an en elevational view of an exemplary embodiment of several components of the present invention.

In a preferred embodiment, the arms 70, 71, 72, 73 are made of retractable discs 80 with reinforced sides, such as five discs, that when extended, lock into place creating a solid arm that can be locked into place with a locking mechanism. When retracted, the discs 80 stack on top of each other. In another embodiment, illustrated in FIG. 7 the discs 80 overlap wherein a retraction point 88 is provided within the internal groove or track 85, below the first disc closest to the housing 10. When extended, outward, a disc, connected between the retraction point 88 and an adjacent disc pulls the point to the center of the first disc, thereby securing the discs 80. In another embodiment, the arms can be made of other elements other than discs that extend and retract. For example, the arms can be telescoping wherein segments fit within other segments where the largest leg is closest to the housing and the segments grow smaller the further out the leg extends.

In operation, by effectively cooling air space 43 above which the laptop computer 32 sits, the present invention 5 forces the laptop-generated hot air to dissipate downwards, towards the air space 43 and away from the laptop computer 32. With an increased dissipation of heat away from the laptop computer 32 and towards air space 43, a convective heat sink is effectively created which in turn decreases the temperature within the laptop computer 32. With heat being dissipated away from the inside of a laptop 32 to a convective heat sink, computer components, not shown, are no longer susceptible to the excessive heat damage once experienced with the ineffective use of stationary fans.

The present invention 5 has been described in terms of a separate device, but in an alternate embodiment the invention 5 could be designed for permanent attachment to a portable computer, or the features could be incorporated in to the design of a portable case. In this embodiment, the heat sink could cover essentially all of the lower surface of the portable computer 32 or be configured to cover only those portions of the lower surface which are most likely to require additional cooling, such as near the battery or processor.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated. Accordingly, it is intended that the invention not be limited to the specific illustrative embodiment but be interpreted within the full spirit and scope of the appended claims

What I claimed is:

1. A device for cooling a computer, said device comprising:
   a housing with a sidewall and a bottom forming an inner cavity;
   a horizontal board having a first end and a second end disclosed within said inner cavity;
   a motor connected to said horizontal board to rotate said horizontal board;
   a track disposed within said inner cavity with sections of said track at a higher elevation than other sections of said track;
   a first fan connected to a first end of said horizontal board displacing air vertically and nearly vertically connected to an end of said horizontal board and riding upon said track;
   a second fan fixed therethrough said sidewall to move air from outside of said housing to within said inner cavity;
   a third fan fixed therethrough said sidewall to move air from within said inner cavity to outside said housing; and
   a connection point to secure said computer to said device.

2. The device of claim 1 further comprising a fourth fan connected to said second end of said horizontal board.

3. The device of claim 1 wherein said connection point comprises arms that extend from said housing and respective stands that connect to a respective arm.

4. The device of claim 3 wherein said arms are connected to a center within said cavity by a connector that allows said arms to swivel.

5. The device of claim 4 wherein said arms swivel three hundred and sixty degrees.

6. The device of claim 3 further comprising doors formed therethrough said housing through which said arms and said stands extend from said housing.

7. The device of claim 1 further comprising segments removed from said horizontal board.

8. The device of claim 7 wherein said segments are conformed to create a foil to direct air upward therethrough said segments.

9. The device of claim 1 wherein said first fan has a surrounding structure which comprises wheels extending to ride upon said track.

10. The device of claim 1 further comprising a power source to provide power to at least one of said first fan, said second fan, said third fan, and said motor.

11. The device of claim 1 wherein said power source comprises at least one of a battery, power from an electrical outlet, and power from said computer.

12. The device of claim 1 further comprising a control to regulate a speed of at least one of said first fan, said second fan, said third fan, and said motor.

13. The device of claim 1 wherein said second fan is at a same height as said horizontal board.

14. The device of claim 1 wherein said third fan is at a height above said horizontal board.

15. The device of claim 1 further comprising a top cover with vents formed therethrough.

16. The device of claim 15 wherein a ridge extends upward from said top cover.

17. The device of claim 1 wherein said housing is cylindrical in shape.

18. The device of claim 1 wherein when said computer is attached to said connection point an air cushion is created between a bottom of said computer and said top cover.

19. A method for cooling internal components of a portable computer, said method comprising:

placing a track within a cavity formed within a circular housing assembly wherein said track has a high elevation and a low elevation;

providing a motor to rotate a wing positioned within said cavity;

connecting a first fan to a first end of said wing with a connector allowing said fan to move about its axis;

rotating said first fan along said track wherein said first fan rises and lowers based on said track elevation;

blowing air upward with said first fan;

blowing air into said cavity with a second fan formed therethrough said circular housing assembly;

exhausting air out of said cavity with a third fan formed therethrough said circular housing assembly;

securing said computer with a connector above said housing assembly whereby an air cushion is formed between said housing assembly and said computer.

20. The method of claim 19 further comprising providing a power source to operate at least one of said motor, said first fan, said second fan, and said third fan and a controller to operate at least one of said motor, said first fan, said second fan, and said third fan.

* * * * *